(12) United States Patent  
Maienschein

(10) Patent No.: US 10,443,682 B2  
(45) Date of Patent: Oct. 15, 2019

(54) CENTRIFUGAL PENDULUM

(71) Applicant: Schaeffler Technologies AG & Co. KG, Herzogenaurach (DE)

(72) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/081,094

(22) PCT Filed: Feb. 27, 2017

(86) PCT No.: PCT/DE2017/100153  
§ 371 (c)(1),  
(2) Date: Aug. 30, 2018

(87) PCT Pub. No.: WO2017/152906  
PCT Pub. Date: Sep. 14, 2017

(65) Prior Publication Data  
US 2019/0011012 A1     Jan. 10, 2019

(30) Foreign Application Priority Data

Mar. 10, 2016 (DE) .................. 10 2016 203 963  
Apr. 7, 2016 (DE) .................. 10 2016 205 759

(51) Int. Cl.  
*F16F 15/14*     (2006.01)

(52) U.S. Cl.  
CPC ........ *F16F 15/145* (2013.01); *F16F 2222/08* (2013.01); *F16F 2228/001* (2013.01); *F16F 2232/02* (2013.01)

(58) Field of Classification Search  
CPC .... F16F 15/14; F16F 15/1414; F16F 15/1421; F16F 15/145; F16F 2222/08; F16F 2228/001; F16F 2232/02  
See application file for complete search history.

(56) References Cited

U.S. PATENT DOCUMENTS

| | | | |
|---|---|---|---|
| 8,161,740 B2 * | 4/2012 | Krause | F16F 15/145 |
| | | | 192/30 V |
| 2017/0009844 A1 * | 1/2017 | Verhoog | F02B 75/18 |

(Continued)

FOREIGN PATENT DOCUMENTS

| | | |
|---|---|---|
| CN | 102245928 A | 11/2011 |
| DE | 102009037481 A1 | 3/2010 |

(Continued)

OTHER PUBLICATIONS

Machine translation of WO 2014005907 A1 A obtained on Mar. 4, 2019.*

(Continued)

*Primary Examiner* — Adam D Rogers  
(74) *Attorney, Agent, or Firm* — LeKeisha M. Suggs

(57) ABSTRACT

A centrifugal pendulum includes a pendulum carrier arranged rotatably about an axis of rotation and a plurality of pendulums distributed over a circumference of the pendulum carrier. The plurality of pendulums are received on the pendulum carrier so as to be able to move along pendulum paths with a predefined pendulum mass. A spring element acting in a circumferential direction, and with a predefined spring rate, is provided between two adjacent pendulums in the circumferential direction. The pendulums and the spring elements are adjusted to a predefined excitation order taking into account the gravity acting on the pendulums.

12 Claims, 1 Drawing Sheet

(56) References Cited

U.S. PATENT DOCUMENTS

2017/0102045 A1* 4/2017 Krause ................. F16F 15/145
2017/0138437 A1* 5/2017 Wahl .................... F16F 15/145

FOREIGN PATENT DOCUMENTS

| DE | 102012221103 A1 | | 5/2014 | | |
|----|----|----|----|----|----|
| DE | 102014216540 A1 | | 3/2015 | | |
| DE | 102015204011 A1 | | 9/2016 | | |
| DE | 102016221576 A1 | * | 5/2018 | ............ | F16F 15/145 |
| WO | 2014005907 A1 | | 1/2014 | | |
| WO | WO-2014005907 A1 | * | 1/2014 | ............ | F16F 15/145 |
| WO | 2015149789 A1 | | 10/2015 | | |
| WO | 2015149792 A1 | | 10/2015 | | |
| WO | 2015149794 A1 | | 10/2015 | | |
| WO | WO-2017028858 A1 | * | 2/2017 | ............ | F16F 15/145 |
| WO | WO-2018010722 A1 | * | 1/2018 | | |
| WO | WO-2018036591 A1 | * | 3/2018 | ............ | F16F 15/145 |

OTHER PUBLICATIONS

Machine translation of DE 102015204011 A obtained on Mar. 5, 2019.*

* cited by examiner

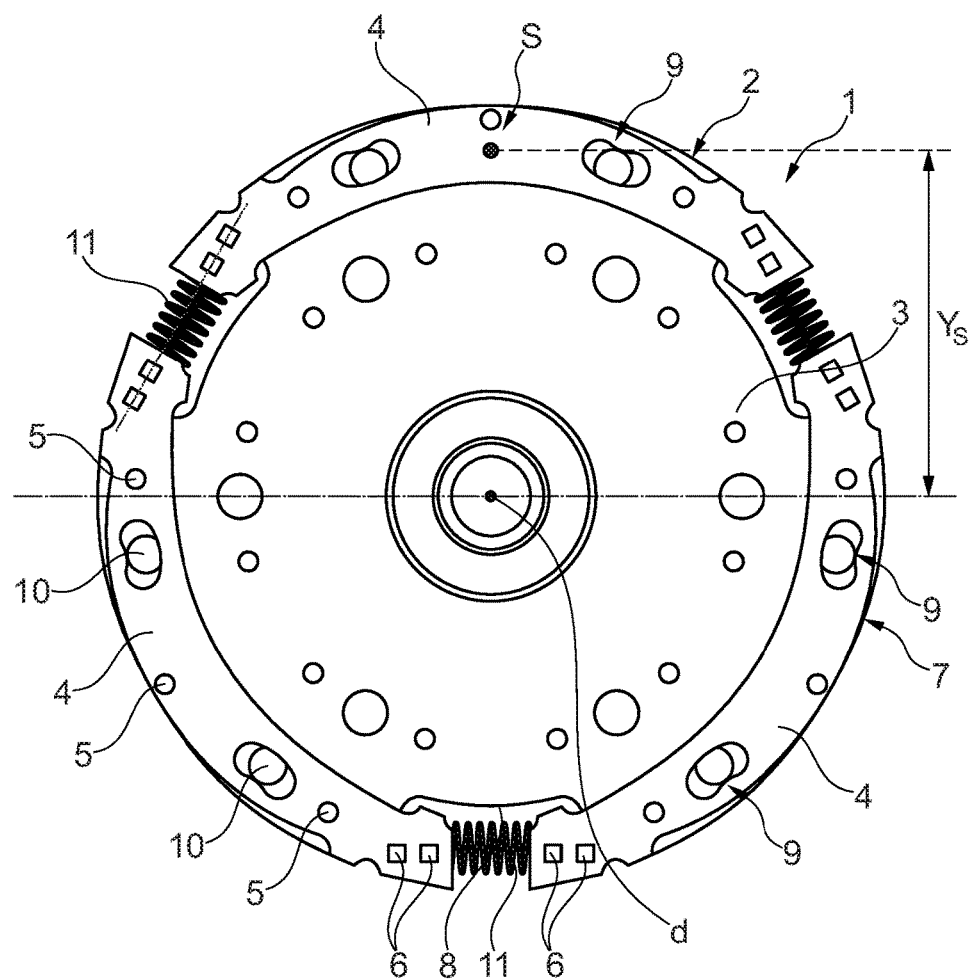

CENTRIFUGAL PENDULUM

CROSS-REFERENCE TO RELATED APPLICATIONS

This application is the U.S. National Phase of PCT Appln. No. PCT/DE2017/100153 filed Feb. 27, 2017, which claims priority to DE 10 2016 203 963.6 filed Mar. 10, 2016 and DE 10 2016 205 759.6 filed Apr. 7, 2016, the entire disclosures of which are incorporated by reference herein.

TECHNICAL FIELD

The present disclosure relates to a centrifugal pendulum with a pendulum carrier arranged rotatably about an axis of rotation and several pendulums, which are distributed over the circumference and are received on said carrier perpendicular to the axis of rotation so as to be able to move in pendulum fashion, with a predefined pendulum mass, wherein a spring element, which acts in the circumferential direction, with a predefined spring rate is provided in each case between two adjacent pendulums in the circumferential direction.

BACKGROUND

Centrifugal pendulums are used as rotational speed-adaptive torsional vibration absorbers in order to vibration-insulate in drivetrains of motor vehicles. In this case, pendulums are received on a pendulum carrier arranged rotatably about an axis of rotation in a manner distributed over the circumference and so as to be able to move in pendulum fashion, which pendulums are deflected in the centrifugal force field of the rotating pendulum carrier depending on torque non-uniformity with respect to the pendulum carrier on predefined pendulum paths or raceways and as a result the mass moment of inertia of the centrifugal pendulum is changed and a vibration-damping effect occurs. The centrifugal pendulum is configured for an excitation frequency which is adapted in a preferred manner to a main vibration order of the excitation source—in drivetrains of motor vehicles of the internal combustion engine.

In order to synchronize the pendulums elastically with one another and avoid pendulums arranged above the axis of rotation falling out of their pendulum bearings in the case of a stationary centrifugal pendulum and noises during switching off and restarting of the internal combustion engine, it is proposed in DE 10 2009 037 481 A1 to couple circumferential side ends of the pendulums adjacent in the circumferential direction to one another by means of spring units.

A centrifugal pendulum, in the case of which spring elements which have a rigidity in a predefined range are arranged at the circumferential side ends of the pendulums or pendulum masses adjacent in the circumferential direction, is proposed in German patent application no. 10 2015 204 011.9 which was not published at a prior date.

SUMMARY

In the case of centrifugal pendulums with pendulums or pendulum masses coupled in the circumferential direction by means of spring elements, a phase-shifted vibration of the pendulums or pendulum masses can be observed.

The object of the present disclosure is the advantageous further development of a centrifugal pendulum. In particular, the object of the present disclosure is the advantageous further development of a centrifugal pendulum with pendulums coupled elastically to one another in particular to reduce or eliminate the phase-shifted vibration of the pendulums with respect to one another.

The proposed centrifugal pendulum serves as a rotational speed-adaptive torsional vibration damper and contains a pendulum carrier which is arranged rotatably about an axis of rotation and is produced, for example, from sheet metal. The pendulum carrier can be coupled, for example, directly to a crankshaft of an internal combustion engine or integrated into a further assembly, for example, a single-mass flywheel, a torsional vibration damper, for example, a dual-mass flywheel, a friction clutch or a double clutch, a clutch disc thereof, outside or inside a housing of a hydrodynamic torque converter and/or the like. Several such centrifugal pendulums and/or a combination of differently formed centrifugal pendulums and/or other torsional vibration dampers, set, for example, conventionally to a fixed excitation frequency can be received in a drivetrain adjusted in each case to the same and/or different orders of vibration.

Several, preferably two to eight, particularly preferably three or four pendulums, which are distributed over the circumference and are capable of performing a pendulum motion perpendicular to the axis of rotation, are received on the pendulum carrier. The pendulums can be machined in one piece or several pieces from sheet metal and have in each case a pendulum mass which is adjusted to a predefined order of vibration depending on a distance from the center of gravity to the axis of rotation, the configuration of the pendulum paths and the like. Pendulums which are adjacent in the circumferential direction are coupled to one another preferably at the end side in each case by means of a spring element which acts in the circumferential direction with a predefined spring rate. The spring elements can be formed from helical springs such as helical compression springs or helical tension springs, plate springs or plate spring packs, leg springs, spiral springs or the like and from their combination.

It has been shown to be particularly advantageous in this case if the pendulums and spring elements are adjusted to a predefined order of vibration such as, for example, an excitation order induced by the internal combustion engine taking into account the gravity acting on the pendulums. As a result of this, a significant reduction in the phase-shifted vibration processes can be achieved. It has unexpectedly been shown that gravity exerts an additional excitation on the pendulums particularly in the case of low rotational speeds when starting or switching off the internal combustion engine, during idling or in the case of constant higher rotational speeds. As a result of the phase-shifted positioning of the pendulums on the rotating pendulum carrier with respect to the axis of rotation and thus a phase-shifted action of gravity on the pendulums, the pendulums are excited in a phase-shifted manner and vibrate unevenly with respect to the pendulum carrier. It is therefore proposed to include gravity in the configuration of the centrifugal pendulum for a predefined excitation order and configure the active pendulum masses, for example, depending on the radius of their centers of gravity from the rotational axis, and spring rates depending on gravity or acceleration of gravity.

According to one advantageous embodiment of the centrifugal pendulum, this is configured for an excitation order between 0.70 and 1.30, preferably 1.0. The centrifugal pendulum adapted in this manner can be used, for example, for vibration insulation of torsional vibrations of an internal combustion engine in the form of an internal combustion engine with four cylinders according to the four-stroke principle.

According to one advantageous configuration of a centrifugal pendulum taking into account gravity, a ratio between spring rate c and pendulum mass m with distance constant kw, taking into account acceleration of gravity g, can have the following relationship:

$(c*kw)/(m*g)<10$, preferably $0.5<(c*kw)/(m*g)<4.5$, particularly preferably $0.8<(c*kw)/(m*g)<3.2$.

The units for the indicated ratios are as follows: mass m [kg], spring rate c [N/mm], acceleration of gravity g=9.81 m/s², distance constant kw [mm]. In a further configuration alternatively or additionally carried out configuration of the proposed centrifugal pendulum, a ratio between pendulum mass m of the pendulums and a spacing Ys of the center of gravity of the pendulum masses can have the following relationship taking into account acceleration of gravity g and spring constant kc:

$0.02<(m*g)/Ys*kc)<0.06$, preferably $0.03<(m*g)/Ys*kc)<0.05$.

The units for the indicated ratios are as follows: mass m [kg], spring constant kc [N/mm], acceleration of gravity g=9.81 m/s², center of gravity spacing Ys [mm]. The proposed centrifugal pendulum can have a pendulum carrier which is formed as a pendulum flange on which pendulum elements arranged on both sides are received. In this case, axially opposite pendulum elements are connected to one another by means of connection means such as spacing bolts or the like which engage through recesses of the pendulum flange. The pendulum elements connected in this manner jointly form in each case a pendulum with a corresponding pendulum mass. One or both pendulum elements and/or the connection means of adjacent pendulums in the circumferential direction can be coupled by means of the spring elements.

In a further embodiment variant of the centrifugal pendulum, the pendulum carrier can be formed from two side parts which form an axial receiving region. The two side parts can be placed radially on the inside and/or radially on the outside against one another. At a fastening region of the side parts, one or both side parts can be, for example, riveted, screwed, caulked, welded or connected in a similar manner to a further component of the drivetrain. The pendulums are received in this case in the receiving region axially between the side parts distributed over the circumference. In this case, the pendulums are received in each case on both side parts so as to be able to move in pendulum fashion.

Receiving of the pendulums so as to be able to move in pendulum fashion with respect to the pendulum carrier is preferably carried out by means of two pendulum bearings spaced apart in the circumferential direction. For example, the pendulum bearings are provided from recesses provided in each case in the pendulums and in the pendulum carrier, i.e. in the pendulum flange or in both side parts. Raceways such as roller raceways on which a rolling body engaging over the recesses rolls are formed on the pendulums, which raceways are bent radially to the inside on the pendulums and radially to the outside on the pendulum carrier. The formation of the raceways defines the oscillation form and the oscillation angle of the pendulums in the centrifugal force field. For example, an oscillation of the pendulums can be provided by corresponding formation of the raceways in the sense of a bifilar pendulum or as a free form. For example, by formation of the raceways, a pendulum movement of the pendulums can be provided corresponding to a parallel arrangement of the threads of a pendulum suspended in a bifilar manner without self-rotation about the center of gravity. Alternatively, by formation of the raceways, a pendulum movement of the pendulums can be provided corresponding to a trapezoidal arrangement of the threads of a pendulum suspended in a bifilar manner a self-rotation of the pendulums about the center of gravity.

BRIEF DESCRIPTION OF THE DRAWINGS

The present disclosure is explained in greater detail on the basis of the exemplary embodiment represented in the single FIGURE.

The FIGURE shows a centrifugal pendulum arranged about an axis of rotation in accordance with embodiments disclosed herein.

DETAILED DESCRIPTION

The FIGURE shows centrifugal pendulum 1 arranged about axis of rotation d. Pendulum carrier 2 is, in the exemplary embodiment shown, formed as pendulum flange 3 on which pendulum elements 4 are received on both sides distributed over the circumference. Axially opposite pendulum elements 4 are connected to one another by means of connection means 5, 6 forming pendulums 7 with a predefined pendulum mass. Connection means 5, 6 engage, for this purpose, through corresponding recesses, of which only recesses 8 of connection means 6 can be seen.

Pendulums 7 are received so as to be able to move in pendulum fashion on pendulum carrier 2 in each case by means of two pendulum bearings 9 spaced apart in the circumferential direction. Pendulum bearings 9 are formed in each case from recesses with raceways in pendulum elements 4 and in pendulum flange 3 which a rolling body 10 rolling on the raceways, for example, a pendulum roller, engages through.

Spring element 11 is received in each case between adjacent pendulums 7. In the exemplary embodiment shown, this purpose is served by connection means 6 which have corresponding lugs for receiving spring elements 11 formed as helical compression springs, which lugs engage in the inner circumference of the helical compression springs.

In order to configure the pendulum behavior of pendulums 7 as a function of gravity, pendulum mass m of pendulums 7 and spring rate c of spring elements 11 as well as spacing Ys of centers of gravity S of pendulums 7 from axis of rotation d is determined in the idle state of the pendulums. In this case, the ratio between spring rate c and pendulum mass m with distance constant kw, taking into account acceleration of gravity g, is set according to $(c*kw)/(m*g)<10$, preferably $0.5<(c*kw)/(m*g)<4.5$, particularly preferably $0.8<(c*kw)/(m*g)<3.2$ and the ratio between pendulum mass m of pendulums 7 and a spacing Ys of center of gravity S of pendulum masses m, taking into account acceleration of gravity g and spring constant kc, is set according to $0.02<(m*g)/(Ys*kc)<0.06$, preferably $0.03<(m*g)/(Ys*kc)<0.05$.

LIST OF REFERENCE NUMBERS

1 Centrifugal pendulum
2 Pendulum carrier
3 Pendulum flange
4 Pendulum element

5 Connection means
6 Connection means
7 Pendulum
8 Recess
9 Pendulum bearing
10 Rolling body
11 Spring element
d Axis of rotation
S Center of gravity
Ys Spacing

The invention claimed is:

1. A centrifugal pendulum comprising:
a pendulum carrier arranged rotatably about an axis of rotation; and
a plurality of pendulums distributed over a circumference of the pendulum carrier and received on the pendulum carrier, wherein each of the pendulums that are adjacent in a circumferential direction are connected to one another by a spring element, wherein the pendulums and the spring element are adjusted to a predefined excitation order taking into account a gravity acting on the pendulums, wherein a ratio between a spring rate c of the spring element and a pendulum mass m of the pendulums with distance constant kw, taking into account an acceleration of gravity g, has the following relationship:

$(c*kw)/(m*g)<10.$

2. The centrifugal pendulum as claimed in claim 1, wherein the excitation order is between 0.70 and 1.30.

3. The centrifugal pendulum as claimed in claim 1, wherein a ratio between the pendulum mass m and a spacing YS of a center of gravity (S) of the pendulums, taking into account the acceleration of gravity g and a spring constant kc of the spring element, has the following relationship:

$0.02<(m*g)/(YS*kc)<0.06.$

4. The centrifugal pendulum as claimed in claim 1, wherein each of the plurality of pendulums is received on the pendulum carrier by two pendulum bearings spaced apart in the circumferential direction.

5. The centrifugal pendulum as claimed in claim 4, wherein the pendulum bearings are formed from recesses provided in each case in the pendulums and in the pendulum carrier with bent raceways on which a rolling body which engages over the recesses rolls.

6. The centrifugal pendulum as claimed in claim 5, wherein a pendulum movement of the pendulums without self-rotation about a center of gravity (S) is provided by formation of the raceways.

7. The centrifugal pendulum as claimed in claim 5, wherein a pendulum movement of the pendulums with self-rotation about a center of gravity (S) is provided by configuration of the raceways.

8. A centrifugal pendulum comprising:
a pendulum carrier arranged rotatably about an axis of rotation; and
a plurality of pendulums distributed over a circumference of the pendulum carrier, wherein each of the pendulums that are adjacent in a circumferential direction are coupled to one another by a spring element, wherein the pendulums and the spring element are adjusted to a predefined excitation order as a function of gravity acting on the pendulums, wherein a ratio between a pendulum mass m of the pendulums and a distance YS from a center of gravity (S) of the pendulums to the axis of rotation, taking into account an acceleration of gravity g and spring constant kc of the spring element, is set according to: $0.03<(m*g)/(YS*kc)<0.05.$ 9. The centrifugal pendulum of claim 8, wherein each of the pendulums includes a first pendulum element and a second pendulum element arranged on axially opposite sides of the pendulum carrier and connected to one another.

10. The centrifugal pendulum of claim 8, wherein a ratio between a spring rate c of the spring element and the pendulum mass m with distance constant kw, taking into account the acceleration of gravity g, is set according to: $0.5<(c*kw)/(m*g)<4.5.$ 11. The centrifugal pendulum of claim 8, wherein a ratio between a spring rate c of the spring element and the pendulum mass m with distance constant kw, taking into account the acceleration of gravity g, is set according to: $0.8<(c*kw)/(m*g)<3.2.$ 12. The centrifugal pendulum of claim 8, wherein the predefined excitation order is 1.0.

* * * * *